(12) United States Patent
Broeng et al.

(10) Patent No.: US 6,542,681 B2
(45) Date of Patent: Apr. 1, 2003

(54) POLARIZATION PRESERVING OPTICAL FIBRE

(75) Inventors: Jes Broeng, Lyngby (DK); Stig Eigil Barkou, Gentofte (DK); Anders Overgaard Bjarklev, Roskilde (DK)

(73) Assignee: Crystal Fibre A/S, Birkerod (DK)

( * ) Notice: Subject to any disclaimer, the term of this patent is extended or adjusted under 35 U.S.C. 154(b) by 0 days.

(21) Appl. No.: 09/967,844

(22) Filed: Sep. 28, 2001

(65) Prior Publication Data

US 2002/0131737 A1 Sep. 19, 2002

Related U.S. Application Data

(63) Continuation of application No. PCT/DK00/00159, filed on Mar. 30, 2000.

(30) Foreign Application Priority Data

Mar. 30, 1999 (DK) .......................................... 1999 00434

(51) Int. Cl.[7] .................................................. G02B 6/16
(52) U.S. Cl. ........................ 385/123; 385/124; 385/125
(58) Field of Search ................................ 385/123–128, 385/147

(56) References Cited

U.S. PATENT DOCUMENTS

| | | | |
|---|---|---|---|
| 5,802,236 A | 9/1998 | DiGiovanni et al. | 385/127 |
| 6,243,522 B1 * | 6/2001 | Allan et al. | 385/123 |
| 6,334,017 B1 * | 12/2001 | West | 385/123 |
| 6,404,966 B1 | 6/2002 | Kawanishi et al. | 385/125 |

FOREIGN PATENT DOCUMENTS

| | | |
|---|---|---|
| EP | 0810453 A1 | 12/1997 |
| EP | 0905834 A2 | 3/1999 |
| WO | WO 00/49436 | 8/2000 |

OTHER PUBLICATIONS

Broeng, et al., "Analysis of air-guiding photonic bandgap fibers," Optic Letters/vol. 25, No. 2/Jan. 15, 2000.

Monro, et al., "Holey fibers with random cladding distributions," Optic Letters/vol. 25, No. 4/Feb. 15, 2000.

* cited by examiner

Primary Examiner—Phan T. H. Palmer
(74) Attorney, Agent, or Firm—Morgan & Finnegan, LLP

(57) ABSTRACT

A micro-structured optical fibre having a cladding comprising a number of elements having a non-circular cross-section. Each element has at least one part extending outside a circle having the same cross-sectional area as the element. These extending parts are directed in the same direction. This cladding structure provides polarization preserving properties to the optical fibre. Optical fibers using this technology may have claddings with elements placed non-periodically as well as in a two-dimensional periodic lattice-such as cladding providing Photonic Band Gap (PGB) effects.

53 Claims, 13 Drawing Sheets

POLARIZATION PRESERVING OPTICAL FIBRE

The present invention relates to optical fibres and especially to optical fibres having claddings having isolated refractive index elements taking part in defining an overall cladding refractive index.

BACKGROUND OF THE INVENTION

Optical fibres of this type (which may generally be referred to as micro-structured fibres) have been described in a number of references, such as WO 99/64903 and WO 99/64904 describing such fibres having claddings defining Photonic Band Gap (PBG) structures, and U.S. Pat. No. 5,802,236, and Monro et al. (see Optics Letters, Vol 25 (4), p.206, February 2000) defining fibres where the light is transmitted using modified Total Internal Reflection (TIR).

Optical fibres and integrated optical wave guides are today applied in a wide range of applications within the areas such as optical communications, sensor technology, spectroscopy, and medicine. The performance of most such applications is affected by or dependent upon the polarization of the light travelling through the fibre. Many systems also suffer from polarization-dependent losses or polarization-dependent propagation properties that can affect system performance. Design of polarization controlling devices in fibre optical systems is therefore vital. The present invention includes design of novel types of polarization controlling optical fibres, for which the polanzation of light coupled to one end of fibre can be preserved at the output end—so-called polarization maintaining fibres.

Light propagating through an optical fibre can be classified as linearly polarised, elliptically polarised and circularly polarised. If the optical fibre has a deviation away from a perfect circular symmetric design (as is the case for optical fibres in practice), this polarization will generally cause the light to split into separate polarization states (two states for the fundamental mode of optical fibres), which will travel at different speeds along the fibre.

For certain applications it is desirable to enhanced such deviations—and create high-birefringent fibres—as it is e.g., the case for polarization-maintaining fibres (see Agrawal, "Non-linear fiber optics",Academic Press, Second ed., 1995). For other applications, however, even small deviations may be strongly degrading to the system performance. In particular, for high-speed, long-distance optical communication systems (operating at bit-rates of 10 GHz and beyond), an increased attention is now being paid to polarization effects. For such fast systems even very low degrees of birefringence ($<10^{-7}$) occurring in conventional fibres may cause a crucial dispersion differences between the two polarization states, thereby setting upper limits for transmission speed. To explore the potential of PBG-fibres, it is, therefore, important to predict, understand and tailor the polarization effects, which may result in optical fibres.

BRIEF SUMMARY OF THE INVENTION

The present inventors have realised how to provide a significantly higher degree of freedom for tailoring the polarization properties of micro-structured fibres compared to traditional fibres The present inventors have realised that, in fact, the structure of the cladding elements may act in defining the polarization of light transmitted by the fibre. This type of fibre is realised by providing cladding elements, which are not symmetrical around a centre in the core of the fibre. In this manner, the extent of the cladding elements will differ around radial directions seen from the core(s).

In a first aspect, the invention relates to an optical fibre with a waveguide structure having a longitudinal direction, said optical fibre having:
 a core region extending along the longitudinal direction,
 a cladding region extending along the longitudinal direction, said cladding region comprising at least 3 primary, elongated elements each having a centre axis extending in the longitudinal direction of the waveguide, each primary element having a refractive index being different from a refractive index of any material adjacent to the primary element,
each primary element having a shape which, in a cross-section perpendicular to the longitudinal direction, deviates from a circular shape and having parts extending outside a circle having the same area as that of the primary element and having its centre at a centre of the primary element, at least one extending part of each primary element extending at least substantially in a predetermined direction.

A centre of the cross-section of the primary element may be the centre of gravity or the position of the centre of the circle, where the smallest possible area of the primary element extends outside the circle.

Thus, the shape, such as an oblong shape, deviates from a circle having the same area-and consequently parts thereof extend outside the circle.

By applying such non-circular shapes of primary elements, the modal extent of the guided modes of the fibres may be adjusted, so that specific properties may be obtained. Such properties may be related to polarization preserving properties and/or dispersion properties.

These properties may be obtained even if primary elements having different cross-sectional shapes, such as oval shapes and rectangular shapes—as long as the longitudinal axes thereof point in at least substantially the same direction. This is also independent of the relative sizes of the shapes.

In the cross-section, two primary elements may be positioned in a manner so that two lines, each intersecting a centre of a respective of the two primary elements, and both intersecting a centre of the core region, form an angle of at the most 120°, such as in the interval of 10°–120°, such as 15°–115°, such as 30°–110°, such as 40°–105°, such as 50°–100°, such as 70°–100°.

Another manner of characterizing this structure is one, wherein, in the cross-section, two primary elements are positioned in a manner so that a first distance between a centre of the core area and a centre of one of the two primary elements is at least 2 times a second distance between a centre of the core area and a centre of the other of the two primary elements. This first distance may more preferably be at least 3 times the second distance, such as at least 5 times the second distance. such as at least 10 times the second distance.

Preferably, the cladding region comprises at least 6, such as at least 8, preferably at least 10, such as at least 15, preferably at least 20, such as at least 30 primary elements.

In the present context, the effective refractive index of the cladding is defined or generated by the refractive index/indices of the primary elements and one or more cladding materials positioned between the primary elements.

In one situation, the primary elements may, in the cross-section, cover at least part of lattice points of an at least essentially 2D-lattice. More preferably, to further increase photonic band gap effects all lattice points of a part of the lattice are covered by the primary elements. Naturally, it is preferred that the lattice points at least substantially coincide with centres of the primary elements.

In this situation, the primary elements may, in the cross-section, be rotation symmetric, where a rotational symmetry of the 2D-lattice is different from the rotational symmetry of the primary elements. This may e.g. be a situation where the rotation symmetry of the primary elements is a 120° symmetry (such as of a triangular shape) and the rotation symmetry of the lattice is that of a hexagonal (having a 60° symmetry). It should be noted that an element not being rotational symmetric (like the shape of a drop) will have a rotation symmetry of 360°.

In the present context, the predetermined direction will be a predetermined direction in the plane of the cross-section. This direction is preferably the same for the actual extending part of each primary element. Naturally, each primary element may have a plurality of extending parts extending in different directions. In that situation, preferably also these other extending parts extend in predetermined directions— one direction for each extending part of a primary element.

One relatively simple manner of defining a cladding is one wherein the at least one extending part of each primary element has at least one axis of symmetry, corresponding axes of symmetry of the at least one extending part of each primary element extending at least substantially in the predetermined direction.

The primary elements may, in the cross-section, have at least substantially the same shape, such as a triangular shape. In this situation, different primary elements may have different dimensions—such as varying dimensions depending on a distance therefrom to the one or more cores. Alternatively and preferably, the primary elements, in the cross-section, have at least substantially the same dimension(s).

When the shapes of the primary elements, in the cross-section, is at least substantially the same, the primary elements may be orientated in at least substantially the same manner. "Orientated in at least the same manner" will, in the situation where the dimensions are at least substantially the same, mean that, in the cross-section, the areas of the primary elements may be created from that of a single primary element by simple translations thereof.

In the present context, the refractive index of the primary elements is different from that of any material adjacent thereto, meaning that this actual change of index is that providing the structure. This step is not dependent on changes of refractive indices outside the immediate area around the circumference of the primary elements. Naturally, this step may be different for all primary elements, but usually the material adjacent to the primary elements is the same throughout the structure—and so is that of the primary elements, whereby this step will be the same at all circumferences around the primary elements.

Preferably, the refractive index of each primary element is lower than a refractive index of any material adjacent to the primary element.

The material of the cladding region adjacent to the primary elements may be any type of material having a suitable refractive index and being suitable in the production of optical fibres. Presently preferred materials are glass types and polymers.

Each extending part may have an area being larger than 3%, such as larger than 5%, such as larger than 10%, such as larger than 15%, such as larger than 20%, such as larger than 25% of the area of the circle.

Also, at least one extending part may extend a distance of at least 5%, such as at least 10%, such as at least 15%, such as at least 20%, such as at least 30%, such as at least 50%, such as at least 75%, such as at least 100% of the radius of the circle and in a direction away from the centre of the circle.

The primary elements may have, in the cross-section, a shape of a triangle, such as an equilateral triangle—such as having a side length being:
   larger than 15%, such as larger than 25%, such as larger than 35%, such as larger than 45%, such as larger than 55%, such as larger than 65%, such as larger than 75%, such as larger than 85% than a smallest distance between centres of two primary elements, and/or
   larger than 25 nanometers, such as larger than 50 nanometers, such as larger than 100 nanometers, such as larger than 200 nanometers, such as larger than 500 nanometers, such as larger than 1000 nanometers, such as larger than 2000 nanometers, such as larger than 5000 nanometers, such as larger than 10000 nanometers.

Alternatively, the primary elements may have, in the cross-section, a shape of a rectangle, such as having a side length being:
   larger than 15%, such as larger than 25%, such as larger than 35%, such as larger than 45%, such as larger than 55%, such as larger than 65%, such as larger than 75% than a smallest distance between centres of two primary elements, and/or
   larger than 25 nanometers, such as larger than 50 nanometers, such as larger than 100 nanometers, such as larger than 200 nanometers, such as larger than 500 nanometers, such as larger than 1000 nanometers, such as larger than 2000 nanometers, such as larger than 5000 nanometers, such as larger than 10000 nanometers The rectangle may have a shape of a square—such as having a side length being:
   larger than 15%, such as larger than 25%, such as larger than 35%, such as larger than 45%, such as larger than 55%, such as larger than 65%, such as larger than 75% than a smallest distance between centres of two primary elements, and/or
   larger than 25 nanometers, such as larger than 50 nanometers, such as larger than 100 nanometers, such as larger than 200 nanometers, such as larger than 500 nanometers, such as larger than 1000 nanometers, such as larger than 2000 nanometers, such as larger than 5000 nanometers, such as larger than 10000 nanometers.

The primary elements may have, in the cross-section, rounded corners. Sharp corners may be difficult to manufacture precisely, whereby the structure may be originally designed having rounded, more easily manufactured corners.

Optionally, the primary elements may have, in the cross-section, an oval shape, such as a shape where at least one of the half axes of the oval shape is:
   larger than 15%, such as larger than 25%, such than 35%, such as larger than 45%, such as larger than 55%, such as larger than 65%, such as larger than 75%, such as larger than 85% than a smallest distance between centres of two primary elements, and/or
   larger than 25 nanometers, such as larger than 50 nanometers, such as larger than 100 nanometers, such as larger than 200 nanometers, such as larger than 500 nanometers, such as larger than 1000 nanometers, such as larger than 2000 nanometers, such as larger than 5000 nanometers, such as larger than 10000 nanometers.

Depending on the intended use and function of the fibre, the dimensions of the structures of the cladding may vary.

Presently, it is preferred that, in the cross-section, a shortest distance between centres of two primary elements is being larger than 100 nanometers, such as larger than 200 nanometers, such as larger than 500 nanometers, such as larger than 1000 nanometers, such as larger than 5000 nanometers, such as larger than 10000 nanometers, such as larger than 20000 nanometers.

As described above, different functions are possible using cladding elements such as air holes or rods. One embodiment is one where at least some of the primary elements are positioned so as to form, in the cross-section, a periodic structure in the fibre. In this manner, at least this part of the cladding may exhibit a PGB.

In this embodiment, the primary elements may be positioned so as to form, in the cross-section, a periodic structure in the fibre. When the primary elements form a two-dimensionally periodic structure in the fibre, a Photonic Band Gap structure may be obtained.

In the present context, "substantially two-dimensionally periodic" will mean that it is desired to have an optimal periodicity, but that the manners of production will often alter this. In the prior art it is seen that when circular air holes (low index areas) are introduced into a preform of glass and subsequently drawn, the holes will obtain a not-circular shape which is a sign of this substantial periodicity.

This periodic structure may be defined by a unit cell and a polygon may be defined:

having centres of primary elements in its vertices, not enclosing any centres of other primary elements than those having their centres at the vertices of the polygon, and having an area less than or equal to that of the unit cell, the polygon being a triangle, a rectangle, a square, or a hexagonal.

In another embodiment, the primary elements may be positioned so as to form, in the cross-section, a non-periodic structure. In this manner, normally the light will be guided by TIR where the effective refractive index (for a given wavelength) of the cladding is defined by a cladding material and the number, size and position of the primary elements and optionally additional elements in the cladding.

The above aspect of the invention relates to a specific cladding structure and comprises no limitations what so ever on the core region.

In fact, the invention should be taken as one relating to these specific cladding regions for use in any type of optical fibre in combination with one or more cores or core regions of any type.

Normally, in the situation of band gap structures, the core is taken as an area of the structure, where the periodicity of the band gap structure is broken. The band gap structure is designed so as to make light transmission impossible, and an altering of the periodicity will, consequently, make light transmission possible—but only in the core region.

A number of different manners exist for defining a core. In the situation of PGB-fibres, one manner is to replace one or more elements of the periodic structure with other elements with different refractive indices, cross-sectional areas or shapes. Another manner is to have the core also have a periodic structure where only one or more elements are not present.

Preferably, in any situation, the core region would comprise a first additional elongated element extending in the longitudinal direction of the fibre.

An especially preferred first additional element is constituted by air or gas and being defined as a void in the material of the fibre. This void may be inscribed within a circle, said circle having a radius being larger than 100 nanometers, such as larger than 200 nanometers, such as larger than 500 nanometers, such as larger than 1000 nanometers, such as larger than 2000 nanometers, such as larger than 5000 nanometers, such as larger than 10,000 nanometers, such as larger than 20,000 nanometers, such as larger than 50,000 nanometers, such as larger than 100,000 nanometers.

In the situation of a PGB structure, the void may have a cross-sectional area in the cross-section being at least 1, such as at least 2, such as at least 3, such as at least 4, such as at least 5, such as at least 6, such as at least 7, such as at least 8, such as at least 9, such as at least 10 times the cross-sectional area of the unit cell.

Using a void, the light may propagate in and/or around air, which provides a number of advantages both as to transmission loss, dispersion, and when used e.g. as a sensor where gas or liquid may be provided within the void to obtain optimum overlap between the light and the gas or liquid.

In a number of different applications, the additional element or any material adjacent thereto may desirably comprise a dopant (e.g. an active or photosensitive material) or a material showing higher order (non-linear) optical effects.

For communication purposes, higher order (non-linear) effects may be used for e.g. soliton communication or more generally in applications, where non-linear effects are influencing the propagation properties of signals in optical communication systems. This also includes realisation of components for optical signal processing.

For applications for fibre lasers or fibre amplifiers, the dopant may be e.g. a rare-earth dopant adapted to receive pump radiation and amplify radiation travelling in the core region.

Alternatively, the dopant may be a light sensitive dopant, such as Germanium. In that situation, the dopant may be use for e.g. optically writing a grating in the fibre or core region.

For sensor applications, the dopant may be a material responsive to a characteristic of a gas or liquid, which response may be detected optically by light travelling in the core region.

In a number of applications, it is preferred that the core region comprises a second additional elongated element, the first and second additional elements being positioned at a distance where light travelling in one additional element is able to couple to the other additional element.

In one application, one elongated element may be a void holding a liquid or gas which may be too turbid for light to travel through. in that situation, the light may travel in the other element while still coupling with the liquid or gas due to the distance between the elements.

In this situation, one may choose to have the liquid or gas travel only in one or both additional elements—or even in all elongated voids, such as voids of the cladding structure.

Also, by providing two elements between which the light may couple, a number of optical devices may be provided, such as optical fibre couplers. The optical coupling between core elements or core regions may be designed so as to have a predetermined coupling at one or more defined wavelengths, which further makes a number of optical elements possible.

As indicated above, specific advantages will be obtained also when the second additional element is a void.

In fact, especially when the cladding comprises a periodic structure, the fibre may easily be made to comprise a plurality of core regions.

These core regions may be provided sufficiently close for light travelling in one core region being able to couple to one or more core regions.

Alternatively, the core regions may be positioned spaced apart in order to provide a number of separate wave-guides in a single fibre. In fact, the wave guides may be spaced sufficiently apart to allow the band gap structures surrounding each thereof to be different and e.g. be optimised for different wavelengths or wavelength regimes.

Preferably, the core regions are positioned symmetrically within the, preferably periodic, structure, a period of the core regions being larger than a period of the periodic structure.

Naturally, a fibre of the present type may be used for a number of applications where fibres are already used today.

Thus, in a second aspect, the invention relates to a sensor for sensing or detecting at least one characteristic of a liquid or gas, the sensor comprising:

a length of the optical fibre according to the invention, wherein the core region comprises at least a first additional element, the first element being a void extending along the longitudinal direction of the fibre, means for providing the liquid or gas into the void of the core region, means for introducing light into the core region, the light being adapted to interact with the gas or liquid in a manner so that the characteristic of the liquid or gas may be determined, means for detecting light emitted from the fibre and for determining the characteristic of the liquid or gas.

At present, the characteristic may be absorption, absorbance, the presence of a specific agent or material in the gas or liquid, such as for use as a smoke detector, or any other characteristic sensed by an optical sensing method.

If the gas or liquid has a sufficiently low absorption at the wavelength of the light, the introducing means may be adapted to introduce the light into the first additional element. In that situation, an optimum overlap exists between the light and the liquid or gas.

Alternatively, the core region may comprise a second, elongated element extending in the longitudinal direction of the fibre, where the first and second additional elements are positioned at a distance where light travelling in one additional element is able to couple to the other additional element, and wherein the introducing means are adapted to introduce the light into the second additional element. In that situation, the sensing takes place via the light extending from the second to the first element.

In another type of sensor, the characteristic may not be sensed directly by light. In that situation, it may be desired to expose a suitable material to the characteristic, where the response of that material may be sensed optically, Thus, in this situation, at least part of an inner surface of the first additional element may comprise a layer of a material being adapted to alter in response to the characteristic of the gas or liquid, and wherein the introducing means is adapted to introduce light of a wavelength responsive to the altering of the material.

Naturally, the sensor may additionally comprise means for providing the gas or liquid in the fibre, such as for repeatedly providing gas or liquid therein, such as a gas pump if the sensor is used as a smoke detector.

In a third aspect, the invention relates to a fibre amplifier for amplifying an optical signal, said fibre amplifier comprising:

a length of optical fibre according to the invention, wherein the core region comprises a dopant material along at least part of the length, and means for providing pump radiation to the dopant material for pumping the dopant material so as to amplify the optical signal.

In some cases, fibre amplifiers will, further comprise means for spectrally separating the amplified optical signal from the pump signal, in order not to have pump radiation travelling in the fibre outside the amplifying region.

Especially for communication purposes, the dopant would comprise rare-earth ions, such as erbium, ytterbium, neodymium, praseodymium, etc.

For additional purposes, such as if it is desired to optically write gratings or other structures in the fibre or core region, or simply for increasing the refractive index of the core region, the dopant may comprise a photosensitive material, such as germanium.

In an fourth aspect, the invention relates to a fibre laser for outputting laser radiation, said fibre laser comprising:

a length of optical fibre according to the invention, wherein the core region comprises a dopant material along at least part of the length, means for providing pump radiation to the dopant material for pumping the dopant material so as to amplify the optical signal, and feedback means for selectively feeding back at least part of the amplified optical signal so as to repeatedly pass the amplified optical signal through the length of the optical fibre so as to further amplify the optical signal.

Especially for communication purposes, the dopant comprises rare-earth ions, such as erbium.

Also, the dopant may comprise a photosensitive material, such as germanium, in order to facilitate e.g. the writing of gratings in the fibre or core region—or for increasing the refractive index of the core region.

The manufacture of the optical fibres according to the invention may be as that of manufacturing standard PBG fibres in that rods may be provided having therein holes having the preferred cross-sections.

In the following, preferred embodiments of optical fibres according to the invention will be described with reference to the drawings wherein:

DETAILED DESCRIPTION OF THE INVENTION

Figure 1:
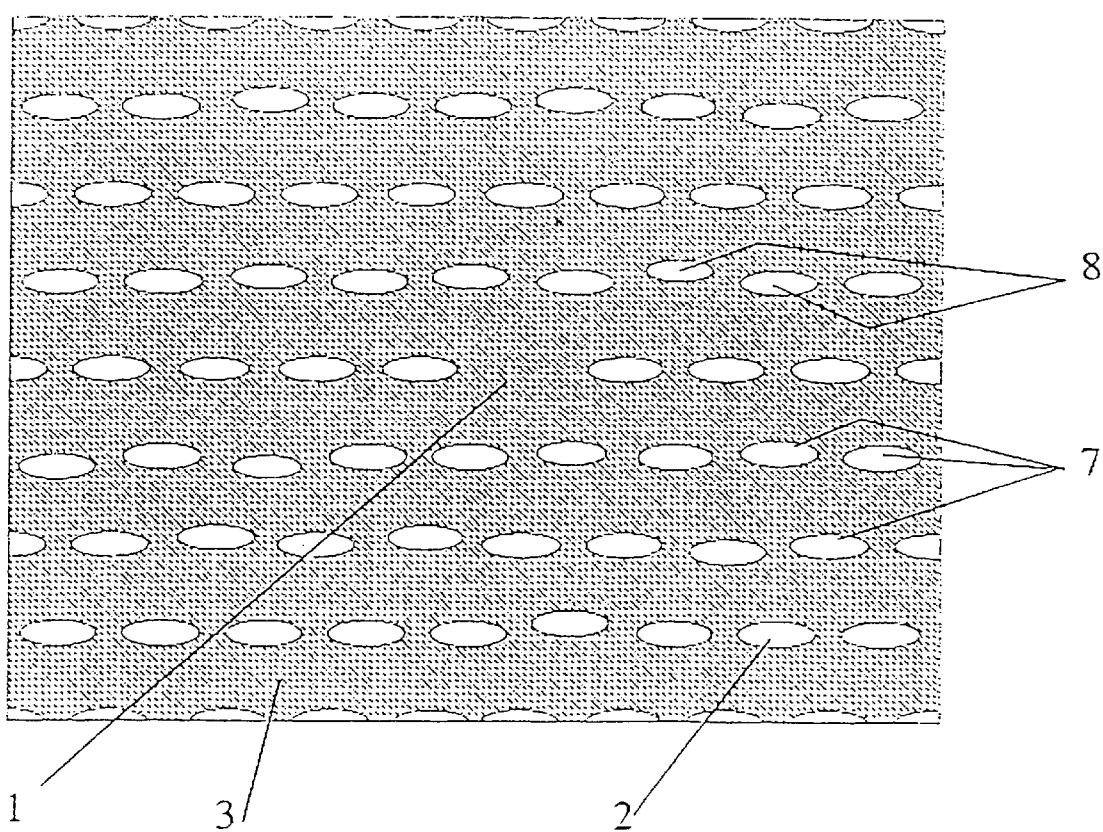
FIG. 1 shows a cross-section of the inner part of an optical fibre covered by the present invention. The cladding consists of a background material and isolated, non-circular elements having substantially identical orientation. The fibre core is formed by omission of a single element.

FIG. 1 illustrates a preferred embodiment of a cross-section of the central part of an optical fibre according to the present invention. The optical fibre consists of a core region along which light may be guided (1) and a cladding region, that is characterized by a multitude (more than 2) elements (2)—these being voids, holes, and/or rods. The elements (2) and the background material of the fibre (3) have different refractive indices—and the elements have in a preferred embodiment identical refractive index.

Figure 2:
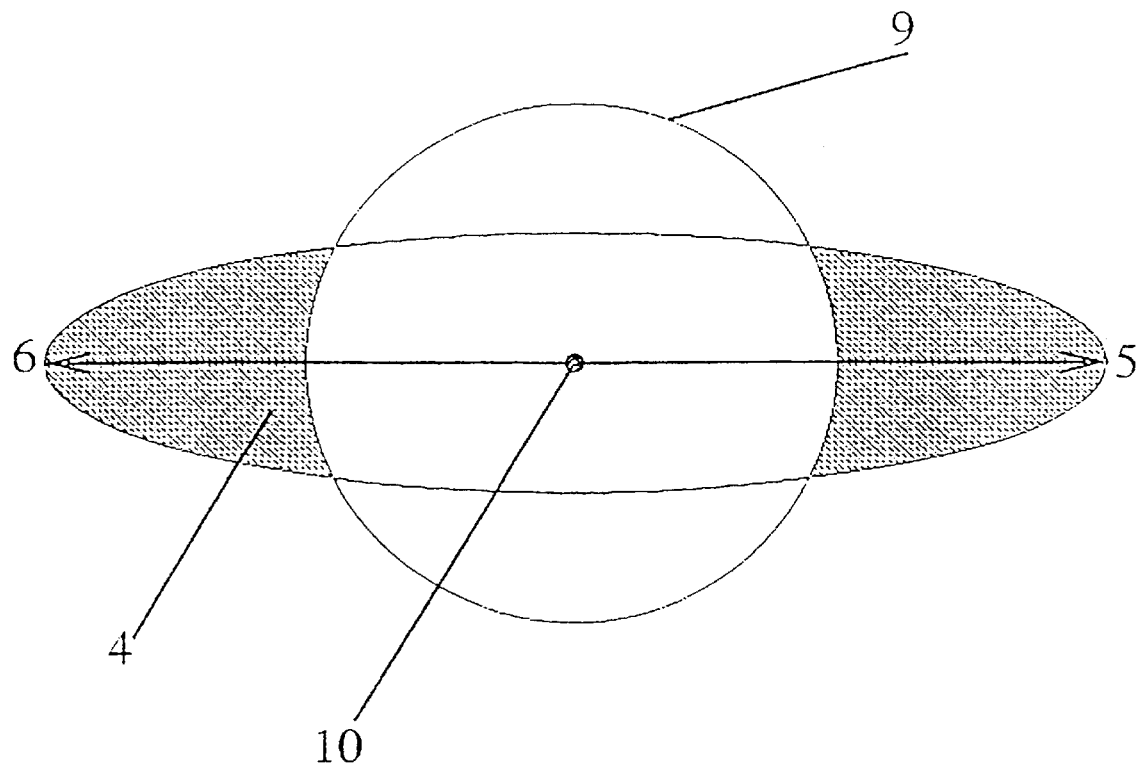
FIG. 2 illustrates the non-circularity of an elliptically shaped cladding element. An auxiliary circle is introduced to quantify the non-circularity of the element, its extending parts, as well as the orientation of the element.

In FIG. 1, a substantial part of the elements have a non-circular shape (in this example an elliptic shape) that is characterised by one or more extending parts (4) different from a circular shape—as illustrated in FIG. 2. The main directions of deformation (5,6) are for a majority of the elements in FIG. 1 substantially identical, i.e. the elements (7) in FIG. 1 have substantially identical orientation.

Figure 3:
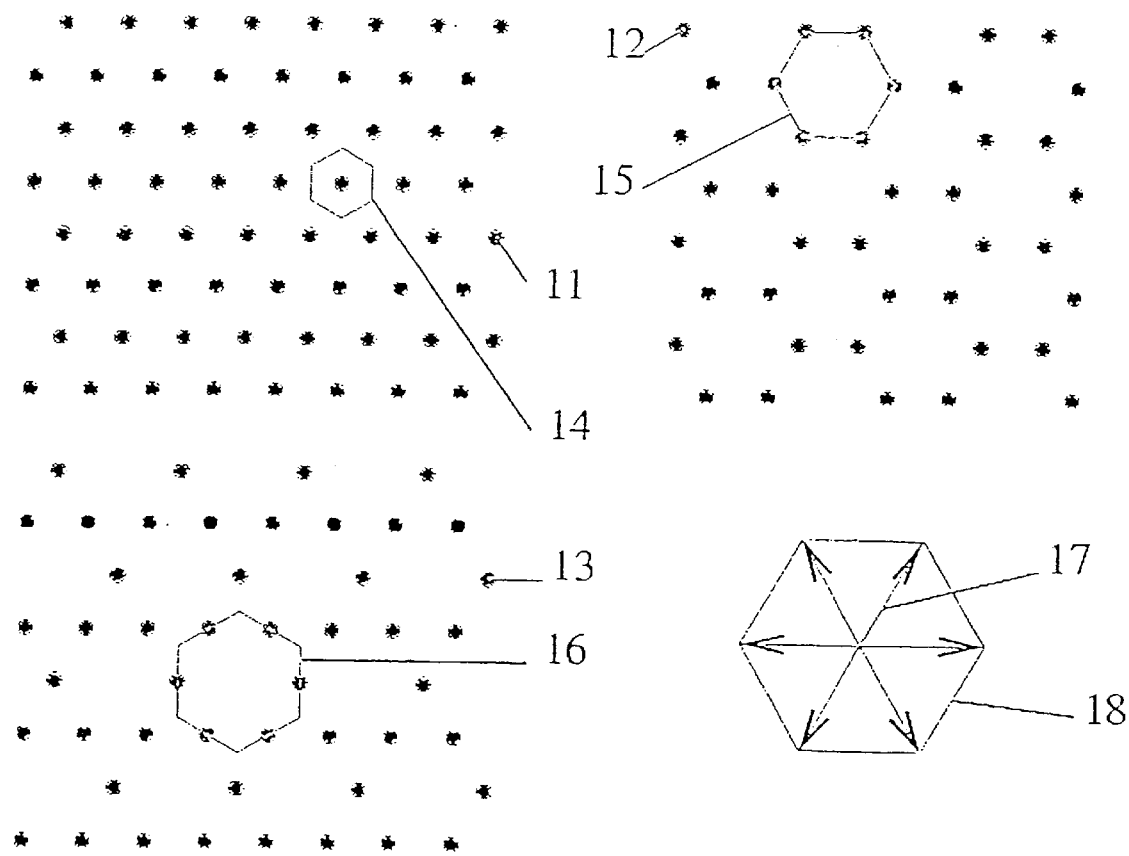
FIG. 3 illustrates three examples of two-dimensional lattice structures, namely a so-called triangular structure, a honeycomb, and a Kagome structure. All three lattices in this figure are characterized by a hexagonal symmetry (i.e. 60 degree rotational symmetry).

It should be noted that in a realistic micro-structured fibre, the centre position of the elements may be slightly distorted away from ideal positions—such as e.g. at two-dimensional lattice points (see proceeding text describing FIG. 3 for examples of lattice structures). This distortion is additionally illustrated in FIG. 1, for example by the two elements (8) that may furthermore have different sizes.

FIG. 2 shows the main directions (5,6) of the extending parts (4) of a preferred embodiment of element shape. To characterize the main directions and the extending parts quantitatively, an auxiliary circle (9) is introduced, which has the same area as the element and has a centre (10) placed at the centre of the element (this element centre should be chosen as the geometrical centre). The main directions (5,6) may, using the auxiliary circle (9), be found as the directions from the centre (10) to the points on the circumference of the element with the largest distance to the centre of the circle. The present invention covers a number of preferred embodiments, where two main directions exists (as seen in FIG. 2) as well as a higher number of main directions (see FIGS. 6 and 8 that will be explained in the proceeding text). The distortion away from the circular shape, and the fact that a majority of the elements have the same orientation, will greatly increase the ability of a fibre cladding according to the present invention to exhibit polarization dependent properties (such as polarization dependent photonic band gaps) and, the shape of the elements (with extending parts) will, therefore, be advantageous for the realisation of micro-structured fibres exhibiting strong polarization effects.

The present inventors have realized that the main directions of elements in the cladding structure should be substantially identical in order to achieve optimum polarization properties. In other words; the cladding elements should have the same orientation. This feature has not been addressed in literature. Furthermore, the present inventors have realized that to optimise the ability of the cladding structure to exhibit polarization effects, the fraction of the area of extended part of an element (4) to the total area of that element should be as large as possible. The present invention, therefore, covers a number of preferred embodiments of the above-discussed fraction.

In another preferred embodiment the non-circular, nearly identically oriented elements are placed such that they cover at least part of the lattice points of a substantially two-dimensionally lattice. For example, the lattice points (11,12, 13) may be arranged with a hexagonal symmetry (60 degree) as shown in FIG. 3 (14,15,16). The hexagonal symmetry of the lattice structure is additionally illustrated in FIG. 3 using the six main directions (17) of a hexagonal unit cell (18). The types of periodic lattices shown in FIG. 3 are well known from the literature on micro-structured optical fibres—see e.g. WO 99/64903 and WO 99/64904—and FIG. 3 illustrates lattice points of a so-called triangular structure (11), a honeycomb or 2D graphite structure (12), or a Kagome structure (13). These structures are all characterized by a hexagonal symmetry, as illustrated by the unit cells (14,15,16). It should be noted that other shapes of unit cells might be used to describe the above-discussed lattice structures, albeit the lattice symmetry is strictly hexagonal. The present invention is not in any way restricted to lattice structures with a hexagonal symmetry.

In a number of preferred embodiments the symmetry of the two-dimensionally periodic lattice is different than the symmetry of the cladding elements. The elements (21) illustrated in FIG. 4 have 180 degree symmetry, whereas the lattice may have a hexagonal symmetry (19). The overall symmetry of such a type of optical fibre will, therefore, be 180 degree, hence, provide a splitting of the degeneracy of two orthogonal polarization states—as e.g. for the fundamental mode of an optical fibre. In other words, any guided modes in the core (20) will have a field distribution, which does not posses 60 degree symmetry. Rather the guided mode(s) will have an elongated field distribution near orthogonal to the main directions of the cladding elements. As known by those skilled in the art such an elongated field distribution will result in birefringence (the propagation constant is different for the at least two orthogonal modes). Such a cladding structure is, therefore, of interest for polarization preserving fibre.

Figure 4:
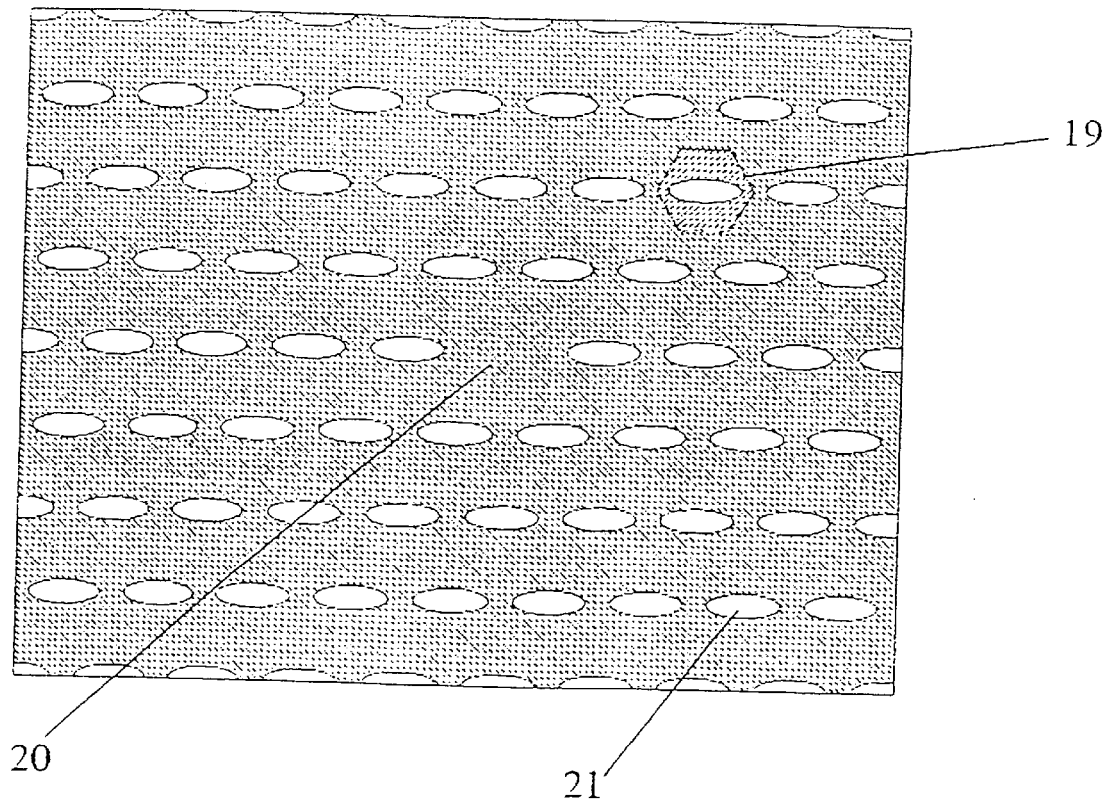
FIG. 4 shows a preferred embodiment of the present invention, where the cladding elements are substantially positioned in a lattice structure. This lattice structure may preferably have a different rotational symmetry than the rotational symmetry of the cladding elements.

In FIG. 4, the core (20) is formed by omitting an element, but a range of other types of cores may also be utilized and may be advantageous as known to those skilled in the art (see e.g. U.S. Pat. No. 5,802,236, WO 99/64903 and WO 99/64904).

Figure 5:
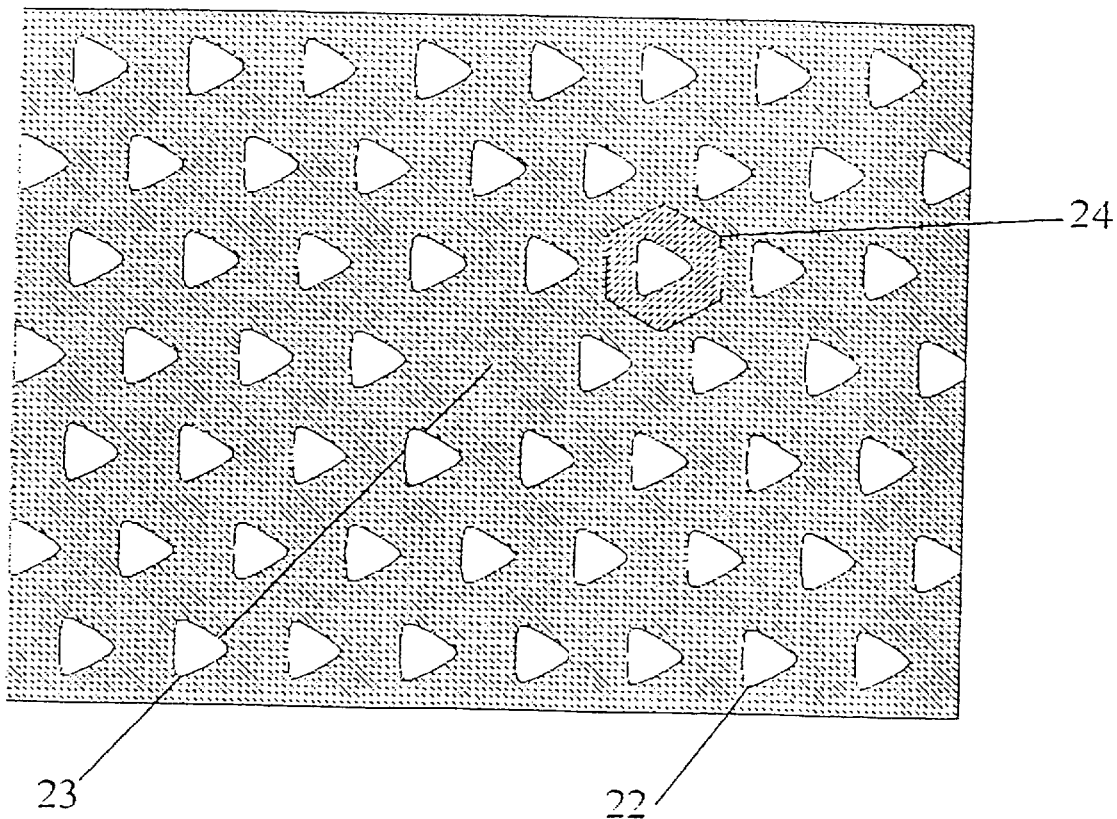
FIG. 5 illustrates another type of fibre covered by the present invention, where the identically oriented cladding elements have 120 degree rotational symmetry. This symmetry is different from the symmetry of the two-dimensional lattice at which the elements are substantially positioned in. The overall symmetry of the cladding structure will modify the birefringence properties (compared to micro-structured fibres with a 60 degree symmetry) and hence is attractive for polarization manipulating applications.

FIG. 5 illustrates another type of fibre covered by the present invention, where the cladding elements (22) have a nearly triangular shape and, therefore, a 120 degree symmetry, and the elements are distributed around a core region (23) on a substantially two-dimensional lattice. The lattice structure In FIG. 5 is characterized by 60 degree symmetry (illustrated using a hexagonal cell (24)). The overall symmetry of this type of cladding structure is, therefore, 120 degree and will modify the birefringence properties and hence is attractive for polarization manipulating applications.

Figure 6:
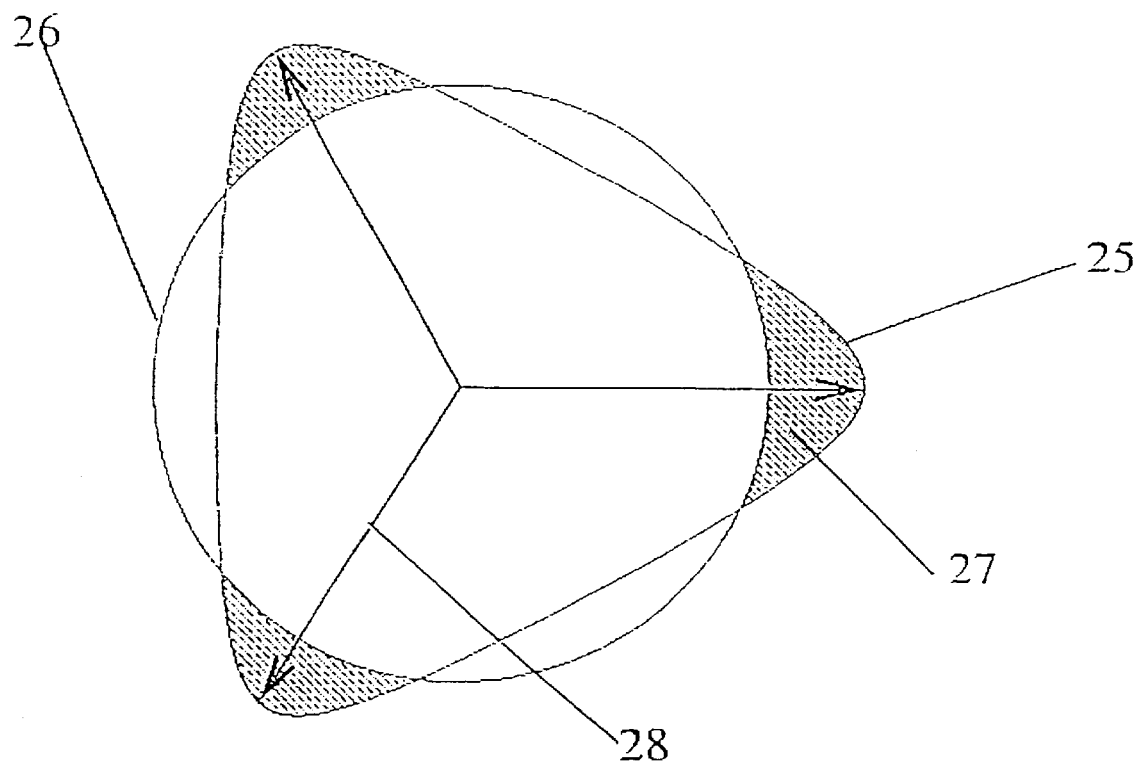
FIG. 6 illustrates the non-circularity of a nearly triangular shaped element. An auxiliary circle is introduced to quantify the non-circularity of the element, its extending parts, as well as the orientation of the element.

FIG. 6 illustrates a nearly triangular-shaped element (25)—such as one of the elements of FIG. 5 (22)—the auxiliary circle (26) and the extending parts of the element (27). The figure further shows the three main directions of the element (28). The symmetry of the element may also be seen as the number of main directions. Hence, an element with a 120 degree symmetry will have three main directions, an element with a 60 degree symmetry (hexagonal symmetry) will have six main directions and so on.

Figure 7:
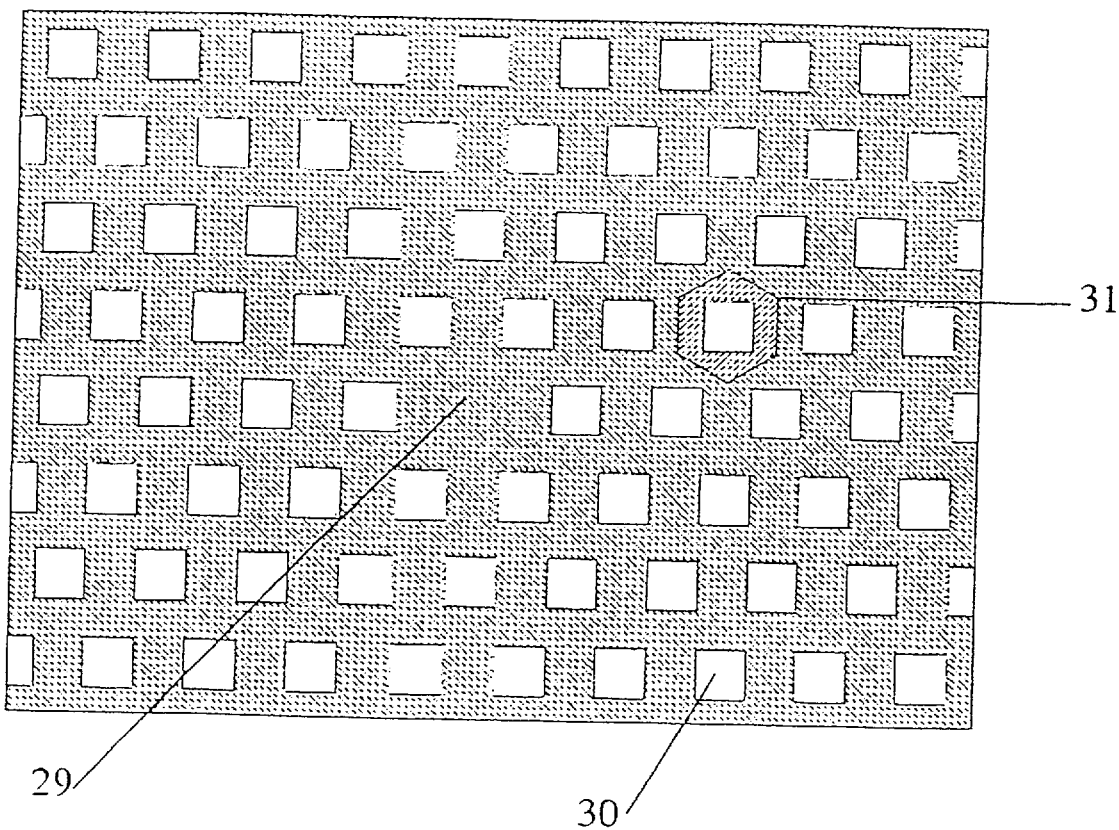
FIG. 7 illustrates a fibre with cladding structure consisting of quadratic-shaped elements. The overall symmetry of the fibre is 180 degree and therefore of advantage for polarization maintaining applications.

FIG. 7 illustrates a fibre with a core (29) and cladding structure consisting of quadratic-shaped elements (30). The elements are place on a substantially two-dimensional lattice with a hexagonal symmetry (31). The elements, therefore, posses 90° symmetry, but not the 60° symmetry of the lattice. Any guided modes in the core (29) will, therefore, have a field distribution, which does not posses 60° symmetry. The overall symmetry of the fibre is 180 degree and therefore favourable for polarization maintaining applications.

Figure 8:
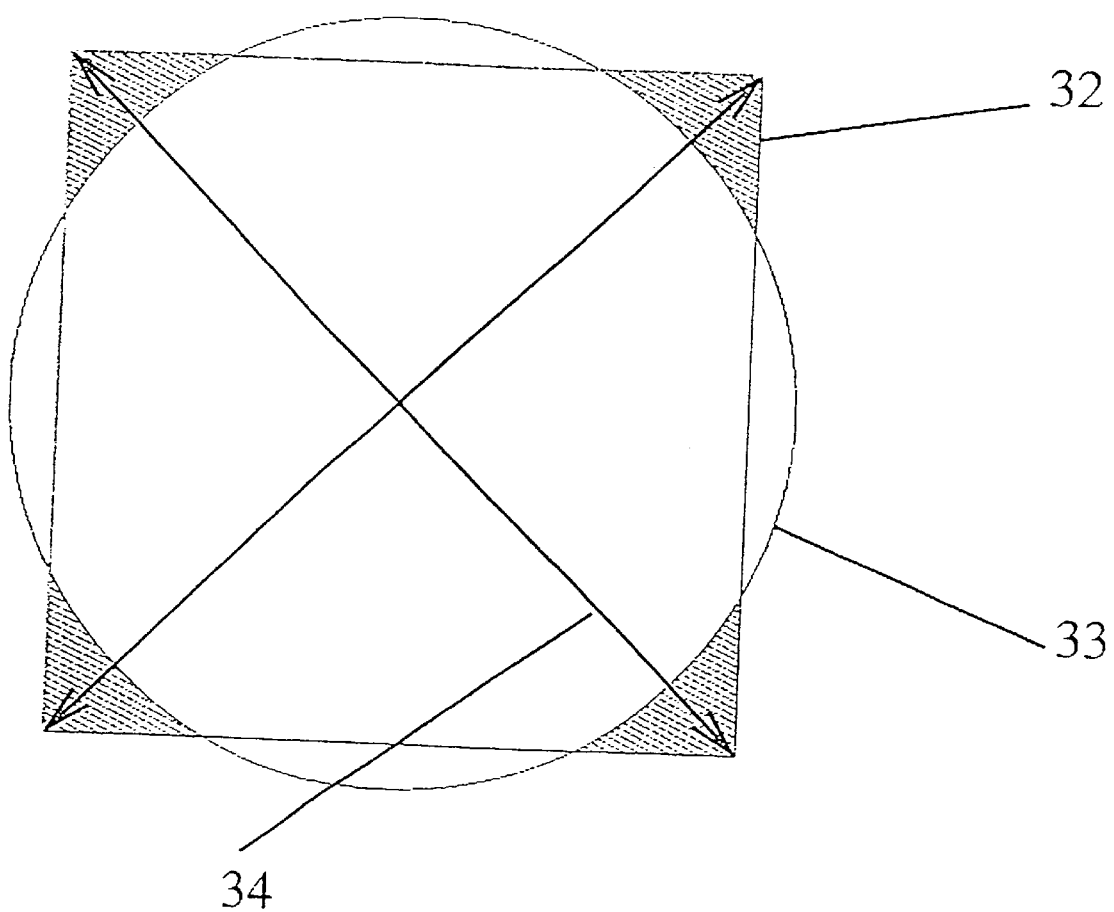
FIG. 8 illustrates the non-circularity of a rectangular-shaped element. An auxiliary circle is introduced to quantify the non-circularity of the element, its extending parts, as well as the orientation of the element.

FIG. 8 illustrates a single of the quadratic-shaped elements shown in FIG. 7 (30). The element has four extended parts—a single of these denoted (32)—and the auxiliary circle is marked (33). Due to the quadratic shape, the element has a 90 degree symmetry and is therefore characterised by four main directions (34).

Figure 9:
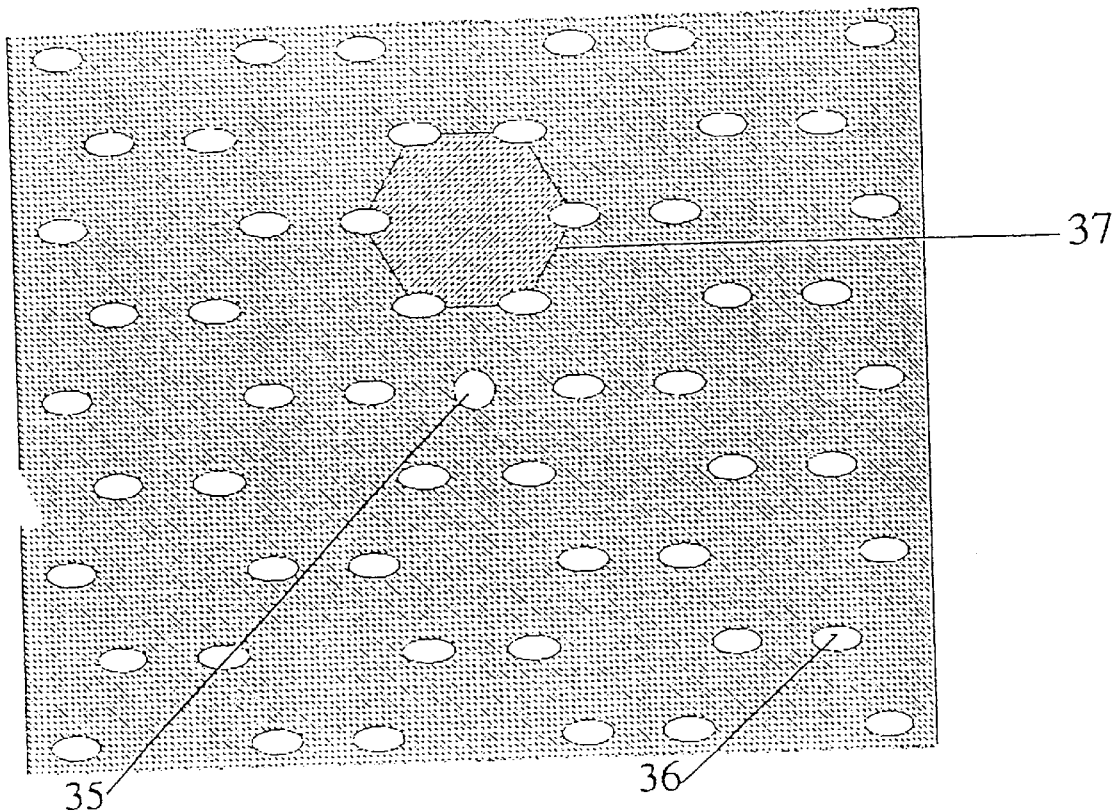
FIG. 9 shows another example of the type of fibres that are covered by the present invention, namely fibres with a low-index element placed centrally in the core region of the fibre. The cladding elements are in this example placed in a so-called honeycomb lattice.

FIG. 9 shows another example of the type of fibres that are covered by the present invention, namely fibres with an element (35) placed centrally in the core region of the fibre. The cladding elements (36) may be placed in a so-called honeycomb lattice that may be characterized by the hexagonal unit cell marked (37).

Figure 10:
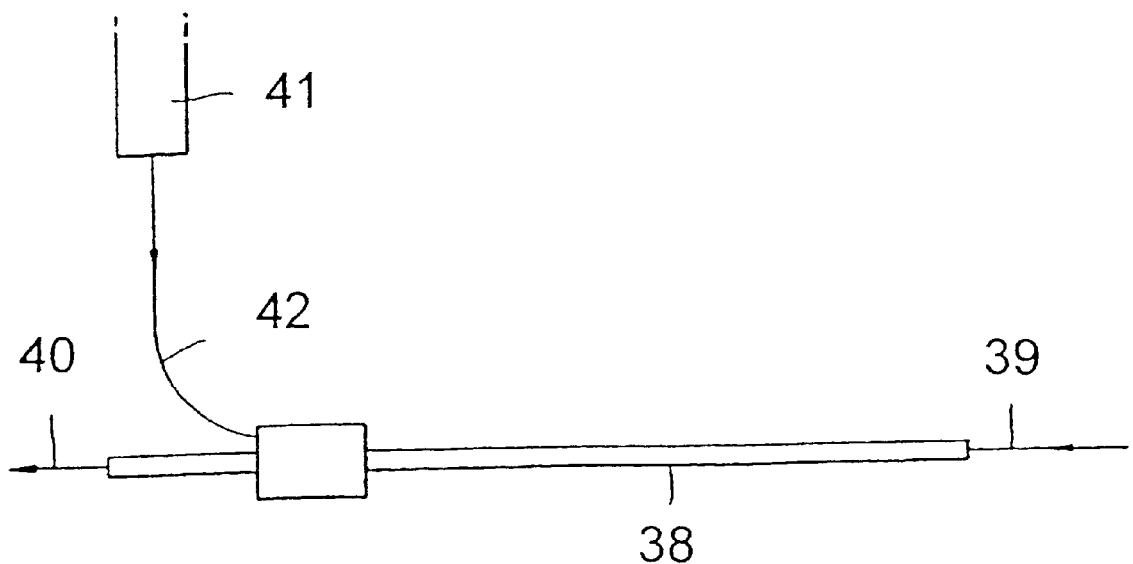
FIG. 10 shows an example of a fibre amplifier based on a length of the fibre according to the invention.

Apart from the passive guidance of light, the here disclosed cladding structures and fibres may be used in various applications. FIG. 10 shows an example of a fibre amplifier comprising a length of the fibre according to the invention (38), an input signal, which is to be amplified (39), an output signal, which has been amplified (40), and a source of radiation (41) for providing a pump power (42). The pump typically excites a dopant, which has been introduced into the length of fibre (e.g., a rare-earth material), or it amplifies the signal through the use of non-linear processes in the waveguide (e.g., through Raman or Brillouin processes).

Figure 11:
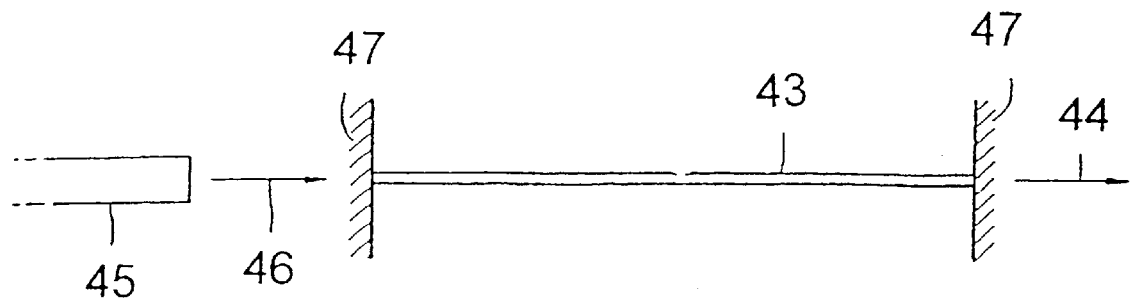
FIG. 11 shows an example of a fibre laser based on a length of the fibre according to the invention.

In FIG. 11 is shown an example of a fibre laser for providing laser radiation. This device comprises a length of fibre according to the invention (43), an output signal (44), and a source of radiation (45) for providing a pump power (46). The fibre laser further comprises means for reflecting (47) the signal travelling inside the laser cavity. The reflection could also be realised through a UV-induced grating to form a distributed feedback laser in the fibre covered by the invention.

Figure 12:
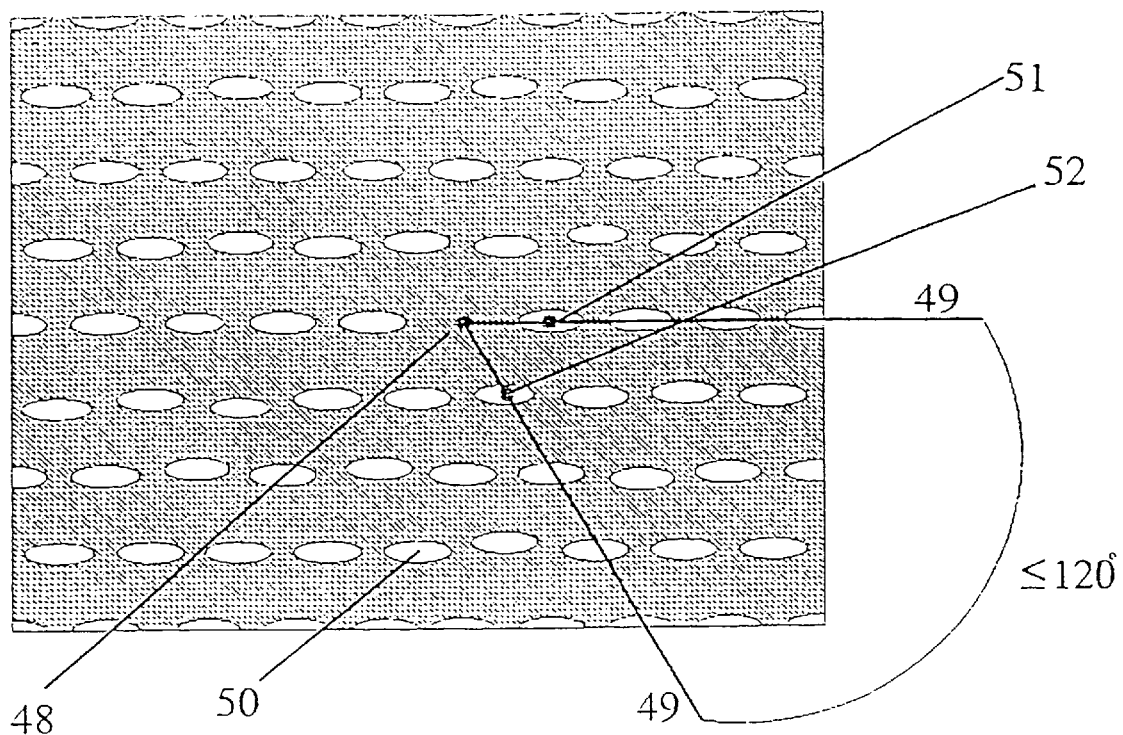
FIG. 12 illustrates the positioning of the cladding elements in a manner significantly different from the axial positioning of cladding elements in conventional polarization maintaining optical fibres (such as e.g. PANDA and Bow-Tie fibres). The elements are distributed around the core region.

Cladding structures covered by the present invention are radically different from the type of cladding structures known from conventional fibre technology (such as so-called PANDA fibres and Bow-Tie fibres etc.). This is further illustrated in FIG. 12 where the angle between the two lines (49) is significantly less than 180 degree (as known to those skilled in the art 180 degree is the logical way to position cladding elements in conventional polarisation maintaining fibres—such as the aforementioned PANDA and Bow-Tie fibres). Each of the lines (49) are defined by any two straight lines connecting the centre of the core (48) and the centres of separate cladding elements (51,52) (both having a non-circular shape and substantially the same orientation). The two lines (49) must not coincide, hence the element centres (51,52) are not identical. The present invention covers preferred embodiments where at least two lines may be defined with an angle not larger than 120 degrees. In another preferred embodiment, the centres (51,52) are chosen from the centres of the cladding elements being nearest to the core—i.e. the two centres (51,52) are chosen such that they have approximately the same distance to the core centre (48). Other element centres than (51,52) may be chosen such that the angle is larger than 120 degrees, but if any centres can be chosen such that the angle is significantly below 180 degrees (not above 120 degrees) the cladding structure will be covered by the present invention (provided that other requirements of the present invention, regarding element orientation etc. is met).

Figure 13:
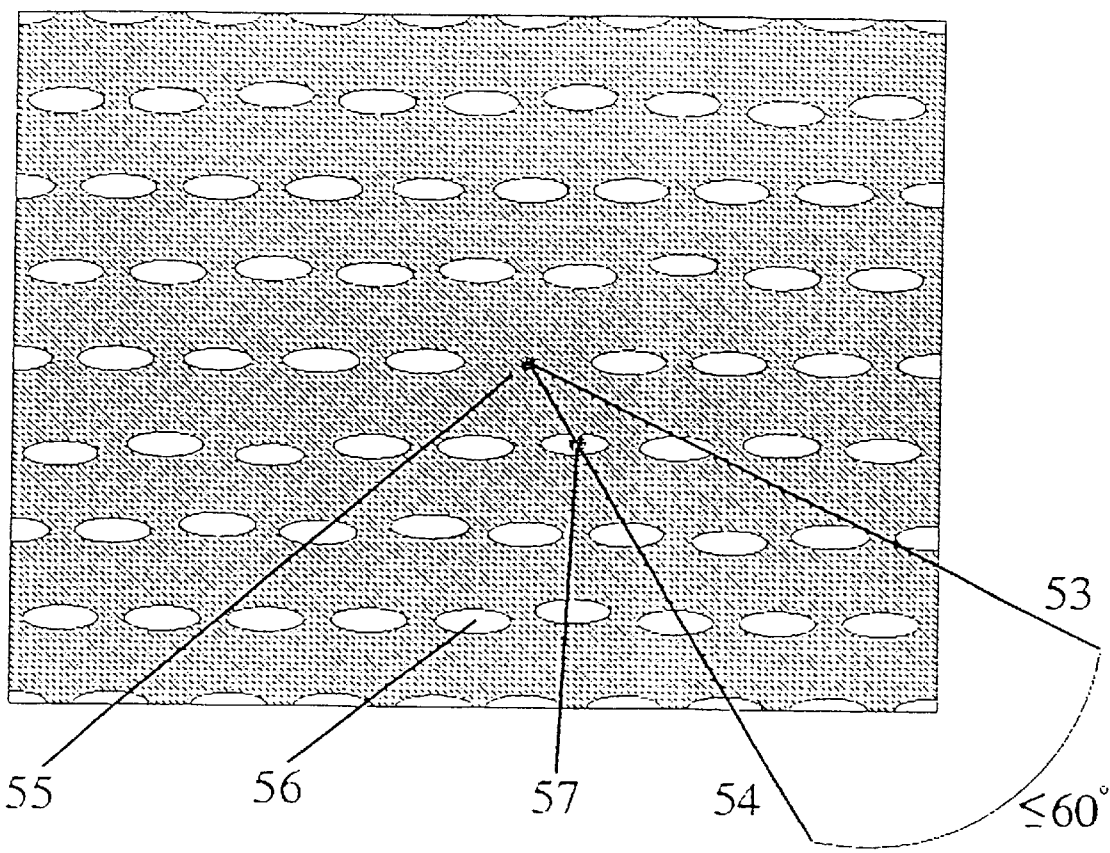
In FIG. 13 is illustrated that any line through the centre of the core is turned 60° or less away from the line running through both the centre of the nearest innermost cladding hole and the centre of the core-region.

FIG. 13 illustrates in yet another manner the difference between PANDA fibres and the polarization maintaining optical fibres covered by the present invention. In FIG. 13 (55) illustrates the core region surrounded by a cladding region with a number of primary elements (56). The line (53) illustrates any line through the geometrical centre of the core-region. Line (54) illustrates a line through the centre of the core as well as through the centre of a primary element (57) closer to the core region, than any other primary element away from the core in the particular direction given by line (54). FIG. 13 illustrates that element (57) exist which has an angle between line (53) and (54) that is less than or equal to 60°.

What is claimed is:

1. An optical fibre with a waveguide structure having a longitudinal direction, said optical fibre having:
   a core region extending along the longitudinal direction,
   a cladding region extending along the longitudinal direction, said cladding region comprising at least 3 primary, elongated elements each having a centre axis extending in the longitudinal direction of the waveguide, each primary element having a refractive index being different from a refractive index of any material adjacent to the primary element,
   each primary element having a shape which, in a cross-section perpendicular to the longitudinal direction, deviates from a circular shape and having parts extending outside a circle having the same area as that of the primary element and having its centre at a centre of the primary element, at least one extending part of each primary element extending at least substantially in a predetermined direction.

2. An optical fibre according to claim 1, wherein the core region comprises a first additional elongated element extending in the longitudinal direction of the fibre.

3. An optical fibre according to claim 2, wherein the core region comprises a second additional elongated element, the first and second additional elements being positioned at a distance where light travelling in and/or around one additional element is able to couple to the other additional element.

4. An optical fibre according to claim 3, wherein the second additional element is a void.

5. An optical fibre according to claim 3, wherein the second additional element is adapted to hold a liquid or gas.

6. (Amended) An optical fibre according to claim 2, wherein the first additional element is a void, said void being adapted to have therein an inscribed circle, said circle having a radius larger than 100 nanometers.

7. An optical fibre according to claim 6, wherein the void is filled with a material comprising a dopant, or filled with a material showing higher order optical effects, or wherein a material adjacent to the void comprises a dopant or comprises a material showing higher order optical effects.

8. (Amended) An optical fibre according to claim 2, wherein the first additional elements is a void having a cross-sectional area, in the cross-section, being at least 1 time the cross-sectional area of a unit cell describing the periodic structure.

9. An optical fibre according to claim 2, wherein the first additional element or any material adjacent thereto comprises a dopant or a material showing higher order optical effects.

10. A fibre amplifier for amplifying an optical signal, said fibre amplifier comprising:

a length of optical fibre according to claim 1, wherein the core region comprises a dopant material along at least part of the length, and means for providing pump radiation to the dopant material for pumping the dopant material so as to amplify the optical signal.

11. A fibre amplifier according to claim 10, wherein the dopant comprises rare-earth ions.

12. A fibre amplifier according to claim 11, wherein the rare-earth ions are erbium.

13. A fibre amplifier according to claim 10, wherein the dopant comprises a photosensitive material.

14. A fibre amplifier according to claim 13, wherein the photosensitive material comprises germanium.

15. A fibre amplifier according to claim 10, further comprising means for spectrally separating the amplified optical signal from the pump signal.

16. A fibre laser for outputting laser radiation, said fibre laser comprising:

a length of optical fibre according to claim 1, wherein the core region comprises a dopant material along at least part of the length, means for providing pump radiation to the dopant material for pumping the dopant material so as to amplify the optical signal, and feedback means for selectively feeding back at least part of the amplified optical signal so as to repeatedly pass the amplified optical signal through the length of the optical fibre so as to further amplify the optical signal.

17. A fibre laser according to claim 16, wherein the dopant comprises rare-earth ions.

18. A fibre laser according to claim 17, wherein the rare-earth ions are erbium.

19. A fibre laser according to claim 16, wherein the dopant comprises a photosensitive material.

20. A fibre laser according to claim 19, wherein the photosensitive material comprises germanium.

21. An optical fibre according to claim 1, wherein the primary elements, in the cross-section, have at least substantially the same shape.

22. An optical fibre according to claim 21, wherein the primary elements, in the cross-section, have at least substantially the same dimension(s).

23. An optical fibre according to claim 22, wherein the primary elements, in the cross-section, are orientated in at least substantially the same manner.

24. An optical fibre according to claim 21, wherein the primary elements, in the cross-section, are orientated in at least substantially the same manner.

25. A sensor for sensing or detecting at least one characteristic of a liquid or gas, the sensor comprising:

a length of the optical fibre according to claim 1, wherein the core region comprises at least a first additional element, the first element being a void extending along the longitudinal direction of the fibre, means for providing the liquid or gas into the void of the core region, means for introducing light into the core region, the light being adapted to interact with the gas or liquid in a manner so that the characteristic of the liquid or gas may be determined, means for detecting light emitted from the fibre and for determining the characteristic of the liquid or gas.

26. A sensor according to claim 25, wherein the introducing means are adapted to introduce the light into the first additional element.

27. A sensor according to claim 25, wherein the core region comprises a second, elongated element extending in the longitudinal direction of the fibre, where the first and second additional elements are positioned at a distance where light travelling in one additional element is able to couple to the other additional element, and wherein the introducing means are adapted to introduce the light into the second additional element.

28. A sensor according to claim 25, wherein at least part of an inner surface of the first additional element comprises a layer of a material being adapted to alter in response to the characteristic of the gas or liquid, and wherein the introducing means is adapted to introduce light of a wavelength responsive to the altering of the material.

29. An optical fibre according to claim 1, wherein the primary elements have, in the cross-section, a shape of a triangle.

30. An optical fibre according to claim 29, wherein the triangle is a equilateral triangle.

31. An optical fibre according to claim 29, wherein the primary elements have, in the cross-section, rounded corners.

32. An optical fibre according claim 1, wherein, in the cross-section, two primary elements are positioned in a manner so that two lines, each intersecting a centre of a respective of the two primary elements, and both intersecting a centre of the core region, form a smallest angle of at the most 120°.

33. (Amended) An optical fibre according to claim 32, wherein the angle is in the interval of 10°-120°.

34. An optical fibre according to claim 1, wherein, in the cross-section, two primary elements are positioned in a manner so that a first distance between a centre of the core area and a centre of one of the two primary elements is at least 2 times a second distance between a centre of the core area and a centre of the other of the two primary elements.

35. (Amended) An optical fibre according to claim 34, wherein the first distance is at least 3 times the second distance.

36. An optical fibre according to claim 1, wherein the primary elements have, in the cross-section, a shape of a rectangle.

37. An optical fibre according to claim 36, wherein the primary elements have, in the cross-section, a shape of a square.

38. An optical fibre according to claim 1, wherein at least part of the primary elements are positioned so as to form, in the cross-section of the fibre, a periodic structure in the fibre.

39. An optical fibre according to claim 38, wherein the periodic structure is defined by a unit cell and where a polygon is defined:

having centres of primary elements in its vertices, not enclosing any centres of other primary elements than those having their centres at the vertices of the polygon, and having an area less than or equal to that of the unit cell, the polygon being a triangle, a rectangle, a square, or a hexagonal.

40. An optical fibre according to claim 1, the fibre comprising a plurality of core regions.

41. An optical fibre according to claim 40, wherein the core regions are positioned symmetrically within the periodic structure, a period of the core regions being larger than a period of the periodic structure.

42. An optical fibre according to claim 1, wherein, in the cross-section, the primary elements cover at least part of lattice points of an at least essentially 2D-lattice.

43. An optical fibre according to claim 42, and wherein, in the cross-section, the primary elements are rotation symmetric, where a rotational symmetry of the 2D-lattice is different from the rotational symmetry of the primary elements.

44. An optical fibre according to claim 1, wherein the cladding region comprises a glass or a polymer positioned so as to be adjacent to the primary elements.

45. An optical fibre according to claim 1, wherein the at least one extending part of each primary element has at least one axis of symmetry, corresponding axes of symmetry of the at least one extending part of each primary element extending at least substantially in the predetermined direction.

46. An optical fibre according to claim 1, wherein the refractive index of each primary element is lower than a refractive index of any material adjacent to the primary element.

47. (Amended) An optical fibre according to claim 1, wherein each extending part has an area being larger than 3% of the area of the circle.

48. (Amended) An optical fibre according to claim 1, wherein at least one extending part extends a distance of at least 5% of the radius of the circle and in a direction away from the centre of the circle.

49. An optical fibre according to claim 1, wherein the primary elements have, in the cross-section, an oval shape.

50. (Amended) An optical fibre according to claim 1, wherein, in the cross-section, a shortest distance between centres of two primary elements is being larger than 100 nanometers.

51. An optical fibre according to claim 1, wherein the primary elements are positioned so as to form, in the cross section of the fibre, a periodic structure in the fibre.

52. An optical fibre according to claim 1, wherein the primary elements are positioned so as to form, in the cross-section, a non-periodic structure.

53. (Amended) An optical fibre according to claim 1, wherein the cladding region comprises at least 4 primary elements.

* * * * *